United States Patent [19]

Anton et al.

[11] Patent Number: 5,145,594
[45] Date of Patent: Sep. 8, 1992

[54] CYANOCARBON COMPOUNDS AS LUBRICANTS IN REFRIGERATION COMPOSITIONS

[75] Inventors: Douglas R. Anton, Claymont; Joe D. Druliner, Newark, both of Del.

[73] Assignee: E. I. Du Pont de Nemours and Company, Wilmington, Del.

[21] Appl. No.: 570,309

[22] Filed: Aug. 20, 1990

[51] Int. Cl.$^5$ .................................................. C09K 5/04
[52] U.S. Cl. .......................................... 252/68; 252/67; 252/50; 62/114
[58] Field of Search ................. 252/68, 50, 67; 62/114

[56] References Cited

U.S. PATENT DOCUMENTS

| | | | |
|---|---|---|---|
| 2,836,613 | 5/1958 | Heininger | 252/68 |
| 3,223,631 | 12/1965 | Morway et al. | 252/50 |
| 3,538,003 | 11/1970 | Lothar | 252/50 |
| 3,723,316 | 3/1973 | Massie | 252/50 |
| 4,248,726 | 2/1981 | Uchinuma et al. | 252/52 |
| 4,267,064 | 5/1981 | Sasaki et al. | 252/52 A |
| 4,324,757 | 4/1982 | Ivy et al. | 252/68 |
| 4,755,316 | 7/1988 | Magid et al. | 252/68 |
| 4,927,554 | 5/1990 | Jolley et al. | 252/68 |
| 4,963,282 | 10/1990 | Jolley et al. | 252/67 |

FOREIGN PATENT DOCUMENTS 1-118598  5/1989  Japan .

Primary Examiner—A. Lionel Clingman
Assistant Examiner—Christine A. Skane

[57] ABSTRACT

A blend of refrigerant with at least one cyanocarbon, which has an SUS viscosity at 100° F. of at least 50 and a pour point of less than about −10° C., is disclosed for use in compression refrigeration.

7 Claims, No Drawings

CYANOCARBON COMPOUNDS AS LUBRICANTS IN REFRIGERATION COMPOSITIONS

FIELD OF INVENTION

This invention relates to lubricants used with refrigerants in compression refrigeration and air-conditioning systems. More particularly, it relates to lubricants for use with saturated hydrocarbons having 1-4 carbon atoms that are partially or fully substituted with at least one atom of chlorine or fluorine, and have a normal boiling point of −80° C. to +50° C. Specifically, this invention relates to lubricants for use with tetrafluoroethanes, e.g. 1,1,1,2-tetrafluoroethane (HFC-134a), and 1,1,2,2-tetrafluoroethane (HFC-134) and of lesser importance, pentafluoroethane (HFC-125). These compounds are being considered as replacements for dichlorodifluoromethane (CFC-12) in appliance refrigeration systems and in automotive air conditioning systems. The lubricants of this invention are miscible over the full operating temperature range for automotive air-conditioning and appliance refrigeration with HFC-134a and the like.

BACKGROUND OF INVENTION

Refrigeration systems that use CFC-12 as the refrigerant generally use mineral oils to lubricate the compressor. (See for example the discussion in Chapter 32 of the 1980 ASHRAE Systems Handbook.) CFC-12 is completely miscible with such oils throughout the entire range of refrigeration system temperatures, i.e. −45° C. to 65° C. In automotive air-conditioning, paraffinic and naphthenic oils of about 500 SUS viscosity at 100° F. are usually used with CFC-12. These oils have "pour points" below −20° C. and viscosities of about 55 SUS at 210° F. and are completely miscible with the CFC-12 refrigerant over the range of temperatures from −10° C. to 100° C. Consequently, oil which dissolves in the refrigerant travels through the refrigeration loop in the air conditioning system and returns with the refrigerant to the compressor. It does not separate during condensation, although it may accumulate because of the low temperature when the refrigerant is evaporated. At the same time, this oil which lubricates the compressor will contain some refrigerant which, in turn, may affect its lubricating properties.

When substituting HFC-134a, HFC-134, or mixtures thereof for CFC-12 in these refrigeration systems, it would be desirable to be able to use the same oils as used with CFC-12. It would not require any substantial change in equipment nor any significant changes in conditions used for the system. If lubricant separates from refrigerant during operation of the system, serious problems may result, i.e. the compressor could be inadequately lubricated. This would be most serious in automotive air-conditioning systems because the compressors are not separately lubricated and a mixture of refrigerant and lubricant circulate throughout the entire system. Unfortunately, however, the mineral oils are substantially immiscible with the tetrafluoroethanes.

Two recent publications of ASHRAE discuss the problems associated with separation of lubricants and refrigerants. These are "Fundamentals of Lubrication in Refrigerating Systems and Heat Pumps" Kruse and Schroeder ASHRAE Transactions Vol. 90 Part 2B, pps. 763-782, 1984 and "Evaluation of Lubricants for Refrigeration and Air-Conditioning Compressors", Spauschus, ibid pps. 784-798.

In summary, refrigerants which are not completely miscible with an oil in the full range of mixture compositions and operating temperatures may become miscible or immiscible as the temperature is raised or lowered from room temperature. The areas of immiscibility may assume a variety of shapes, i.e. parabolic or nonparabolic. As a parabola, the curve of miscibility temperature vs. percent oil in the mixture, may have its open or concave portion facing the low or high temperatures. The closed or convex-portion of the parabolic curve identifies, respectively, the maximum or minimum temperature above or below which the refrigerant and the lubricating oil are completely miscible. These temperatures are referred to as the maximum or minimum "consolute temperatures." Beside parabolas, these curves can assume skewed parabolic shapes or curves of varying slope wherein immiscibility occurs above or below the curve.

One of the objects of this invention is to provide a combination of lubricating oil and refrigerant such as tetrafluoroethane, e.g. HFC-134a, where the area of miscibility encompasses the full range of temperature and composition encountered in compression refrigeration, i.e. complete miscibility occurs for all compositions in the range of −10° C., preferably −20° C. to at least 20° C., preferably −45° C. to 100° C., the critical temperature of HFC-134a. Another object is to provide a process for using such compositions in compression refrigeration.

PRIOR ART

U.S. Pat. No. 4,248,726, issued Feb. 5, 1981, and U.S. Pat. No. 4,267,064, issued May 12, 1981, both to Nippon Oil Company et al, relate to the use of a polyglycol oil such as polyoxypropylene glycol (or an alkyl ether thereof) having a viscosity index of at least 150 and a glycidyl ether type epoxy compound as a high viscosity refrigeration oil composition for halogen-containing refrigerants. These polyglycol/glycidyl ether compositions are disclosed for use with Freon ® 11, 12, 13, 22, 113, 114, 500 and 502; and as being "particularly effective" with Freon ® 12 or 22.

*Research Disclosure* 17486 entitled "Refrigeration Oil by E. I. du Pont de Nemours and Company discloses polyalkylene glycols such as Ucon ® LB-165 and Ucon ® LB-525 sold by Union Carbide Corporation, for use with HFC-134a. These glycols are polyoxypropylene glycols that are mono-functional and are prepared from propylene oxide initiated with n-butanol. The publication states that these combinations of oil and refrigerant are miscible in all proportions at temperatures at least as low as −50° C. and are thermally stable in the presence of steel, copper and aluminum at 175° C. for about six days.

U.S. Pat. No. 4,755,316, issued Jul. 5, 1988, to Allied-Signal Inc. also relates to the use of polyalkylene glycols. These glycols are at least difunctional with respect to hydroxyl groups and contain at least 80% propylene oxide units relative to the total, the remaining 20% may derive from ethylene or butylene oxide or esters, olefins and the like which are polymerizable with propylene oxide.

Japanese 118598 Kokai Patent No. HEI 1(1989)-118598, published May 11, 1989, by Idemitsu Kosan Company, discloses the use of a polysiloxane having the following formula as a lubricant with a variety of refrigerants including hydrogen-containing Freon ® chlorofluoroalkanes and perfluoroalkanes:

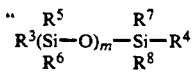

in which $R^3$ and $R^4$ are selected among alkyl groups containing 1–20 carbon atoms, aryl groups containing 6–30 carbon atoms, cycloalkyl groups containing 6–30 carbon atoms, fluorine-substituted alkyl groups containing 1–20 carbon atoms, fluorine-substituted aryl groups containing 6–30 carbon atoms, and fluorine-substituted cycloalkyl groups containing 6–30 carbon atoms; $R^5$ through $R^8$ are selected among fluorine-substituted alkyl groups containing 1–20 carbon atoms, fluorine-substituted aryl groups containing 6–30 carbon atoms, and fluorine-substituted cycloalkyl groups containing 6–30 carbon atoms; m is a constant of 1–100".

SUMMARY OF THE INVENTION

The present invention is based on the discovery that the use of a sufficient amount to lubricate, usually 10–20% by volume for automotive use, and in some situations as high as 50% by volume, of a lubricant comprising at least one cyanocarbon compound having the formula:

$$R(CN)_y$$

wherein

R is a cyclic or linear, saturated or unsaturated hydrocarbyl (alkyl or alkylene), aralkyl, or alkylaryl group having at least three (3) carbon atoms, preferably 3–12 carbon atoms and most preferably 5–8 carbon atoms, and y is an integer selected from 1 to 4, preferably 1 or 2; the lubricant having a SUS viscosity at 100° F. of at least 50, preferably 100–1200 SUS, most preferably 400–600, and a pour point of less than about −10° C., with usually 80–90% by volume of at least one of the tetrafluoroethanes, HFC-134 and HFC-134a, the pentafluoroethane, HFC-125, and any other saturated hydrocarbon having 1–4 carbon atoms that is partially or fully substituted with at least one atom of chlorine or fluorine and a normal boiling point of −80° C. to +50° C., will be completely miscible in one another in the range of temperatures from −20° C. to at least 20° C., preferably to 100° C., the critical temperature of HFC-134a.

The preferred cyanocarbon oils of this invention are at least one selected from the group consisting of n-hexane nitrile, adiponitrile, 2-methyl glutaronitrile, and dicyanocyclooctane. These are either mononitriles or dinitriles of straight chain, cyclic or bicyclic hydrocarbons.

It should be understood that the nitriles of aromatic compounds, e.g. benzonitrile, or of tricyclic hydrocarbons, e.g., dicyanotricyclodecane may be used in minor proportions with the lubricants of this invention to control (improve) the viscosity of the blends. Thus, blends of dicyanocyclooctane or adiponitrile with dicyanotricyclodecane or 2-methyl glutaronitrile not only meet the miscibility target with HFC-134a, but provide viscosities in the preferred range of 100 to 500 SUS.

As a matter of fact, most readily available cyanocarbon compounds do not exhibit sufficient viscosity to approach the higher goal of 500 SUS. Two cyanocarbon compounds, however, are very viscous and even partially crystallize on long standing at room temperature. These latter compounds are dicyanotricyclodecane (prepared by hydrocyanation of cyclopentadiene dimer) and the mixture of mon- di, and trihydrocyanation products of cyclododecatriene. Both of these compounds can be blended with any number of less viscous cyanocarbons to obtain mixtures of desired viscosity and exhibit good solubilites, stabilities and lubricities. From the standpoint of cost and availability, the cyanocarbons of choice to be used in combination with either dicyanotricyclodecane, or with the mixed cyanocarbons starting from cyclododecatriene, would be adiponitrile or 2-methyl glutaronitrile. Another commercially attractive blend for use in hermetically sealed refrigeration systems is that of dicyanocyclooctane and 2-methyl glutaronitrile.

The weight ratio of refrigerant to the lubricant, the specified nitrile oils, may be anywhere from 99/1 to 1/99, preferably 99/1 to 70/30. The viscosity of these oils may range from 50 to 3000 SUS at 100° F., but for most commercial uses, from 100 to 1200 SUS at 100° F.

It is known that the use of an appropriate amount of an "extreme pressure (EP) additive" improves the lubricity and load-bearing characteristics of oils and, thus, would improve the quality of the refrigerant-lubricant compositions. EP additives for use in the invention are included among those disclosed in Table D of U.S. Pat. No. 4,755,316.

EP additives may also be used in conjunction with some of the antiwear additives, oxidation and thermal stability improvers, corrosion inhibitors, viscosity index improvers, detergents and anti-foaming agents disclosed in Table D of U.S. Pat. No. 4,755,316. These additives may also be partially or fully fluorinated.

DESCRIPTION OF PREFERRED EMBODIMENTS

As stated previously, the tetrafluoroethanes, e.g. HFC-134a, HFC-134 and the pentafluoro ethane, HFC-125, particularly HFC-134a have physical characteristics which allow substitution for CFC-12 with only a minimum of equipment changes in compression refrigeration. They could be blended with each other, as well as with other refrigerants, including CFC-12($CCl_2F_2$), HCFC-22($CHClF_2$), HFC-152a($CH_3CHF_2$), HCFC-124($CHClFCF_3$), HCFC-124a($CHF_2CClF_2$), HCFC-142b($CH_3CClF_2$), HFC-32($CH_2F_2$), HFC-143a($CH_3CF_3$), HFC-143($CHF_2CH_2F$), and FC-218 ($CF_3CF_2CF_3$); and for purposes of the present invention such blends are not excluded. However, only those blends of tetrafluoroethane or pentafluoroethane with other refrigerants which are miscible with the lubricants of this invention in the range of −20° C. to about +20° C. are included.

HFC-134a, the preferred tetrafluoroethane refrigerant, may be prepared by any of the methods disclosed in the prior art; e.g., U.S. Pat. No. 2,745,886; 2,887,427; 4,129,603; 4,158,675; 4,311,863; 4,792,643 and British 1,578,933 and 2,030,981.

The nitrile lubricants are commonly prepared by hydrocyanation of olefins using catalysts as described in U.S. Pat. No. 3,496,217.

The nitrile oils may be varied to yield viscosities ranging from 50 to 3000 SUS to 100° F. They may be blended with each other and with other lubricants, e.g. perfluorocarbons, other nitriles or cyano compounds, napthenic, paraffinic, alkylbenzenes, polyalkyl benzenes, etc., to modify viscosity and/or lubrication properties.

Specifically, the lubricants used in the compositions of the invention, and in the invented method for providing lubrication in compression refrigeration and air-conditioning equipment have the following characteristics:

---

Viscosity at 100° F.

50 to 3000 SUS, preferably 100 to 1200 SUS, particularly about 100 to 500 SUS for automotive air-conditioning Pour Point −10° C., preferably below −15° C. for the 100 SUS and 500 SUS oils.

Solubility or miscibility range

100% from 100° C. to less than −40° C. for 1-99 weight percent of HFC-134a in mixture with the lubricant of 100° F. viscosities of 50 SUS to 2500 SUS.

Four-ball wear test with a specific set of steel balls

Scar wear and coefficient of friction equal to or slightly higher than that for the oils currently used with CFC-12 in automotive air-conditioning, i.e., 0.37 mm scar wear and 0.07 friction coefficient when saturated with CFC-12 at atmospheric pressure.

"Falex" (load-to-failure) test with a specific type of steel for the V-block and pin The fail load equal to or greater than that for the CFC/refrigerant oil combinations, i.e., 1300 lbs. when saturated with CFC-12 at atmospheric pressure.

---

1. Solubility of Refrigerant in Lubricants

Six ml. blends of refrigerant and lubricant were used for the solubility studies. Generally, the mixtures contained 30, 60 and 90 wt. % refrigerant. These air-free mixtures were contained in sealed Pyrex ® tubes (7/16" I.D.×5.5", ca. 12.5 cc capacity). The refrigerant/lubricant solubilities were determined by completely immersing the tube in a bath at each test temperature for a minimum of 15 minutes and providing agitation to facilitate mixing and equilibration. The accuracy of determining the temperatures when the refrigerant/lubricant blend became either miscible or immiscible was about ±2° C. The refrigerant/lubricant blends were called immiscible when the blend formed floc; became cloudy or formed two liquid layers. These solubility tests were run from 93° to −50° C. Tests were not run above 93° C. for safety reasons. It is assumed that if the blend of HFC-134a/oil is soluble to 93° C., it will still be soluble at 100° C., the critical temperature of HFC-134a.

2. Stability of Refrigerant and Lubricant

Either 3 cc of refrigerant and 0.52 cc of lubricant or 1.5 cc of refrigerant and 1.5 cc of lubricant plus coupons (steel 1010/copper/aluminum 1100 - 2 3/8"×⅜"×1/16", 120-grit surface finish) were charged and sealed in a pyrex ® tube (7/16" I.D.×5.5", ca. 12.5 cc volume) under anaerobic conditions. The specimens were tied together at the top end with copper wire with copper-wire rings between the metals to separate the metals at the top end. The tubes were stored vertically at 268° F., 300° F. and 350° F. for 11.8 days. Afterwards, the tube contents were examined for appearance changes. These changes were assigned effect ratings: 0—no change; 1—very, very slight change; 2—very slight change; 3—slight change; 4—moderate unacceptable change; and 5—severe change.

The oil in some cases was removed from the tube to determine if the lubricant degraded by measuring its viscosity at 100° F.

3. Lubricity a. Four-ball Wear Test

The procedure is described fully in ASTM D4172. The method was modified as follows: A load of 20 Kg at 1200 RPM was put on the steel 52100 balls immersed in 10 ml. of lubricant at 225° F. for 60 minutes. The refrigerant gas, HFC-134a, was bubbled through a Teflon ® capillary tube into the lubricant at the rate of 0.75 standard cu. ft./hr. to provide one atmosphere of pressure of refrigerant gas over the lubricant and a gas-saturated lubricant.

b. Falex Pin/V-Block Load-to-Failure Test

The procedure is described fully in ASTM D3233. The V-Block was made of AISI C-1137 steel (HRC-20 to 24 hardness, 5 to 10 microinches surface finish). The test pin was made of AISI 3135 steel (HRC-87 to 91 hardness, 5 to 10 microinches surface finish). These tests were run with refrigerant gas bubbling through the oil as in the "Four-ball Wear Test".

4. Viscosity and Viscosity Index a. Viscosity is a property that defines a fluid's resistance to shearing force. It is expressed in terms of absolute viscosity, kinematic viscosity or Saybolt Seconds Universal viscosity (SSU), depending on the method by which it is determined. Conversion from SSU to mm²/s (centistokes) can be readily made from tables contained in ASTM D-445, but it is necessary to know the density to convert kinematic viscosity to absolute viscosity. Refrigeration oils are sold in viscosity grades, and ASTM has proposed a system of standardized viscosity grades for industry-wide usage (D-2422).

Viscosity decreases as the temperature increases; and increases as the temperature decreases. The relationship between temperature and kinematic viscosity is represented by:

$$\log \log (v+0.7) = A + B \log T$$

where
- $v$ = kinematic viscosity, mm²/s (CST)
- $T$ = thermodynamic temperature (kelvin)
- $A, B$ = constants for each oil This relationship is the basis for the viscosity temperature charts published by ASTM and permits a straight line plot of viscosity over a wide temperature range. This plot is applicable over the temperature range in which the oils are homogeneous liquids.

b. Viscosity Index is a measure of the amount of change in viscosity experienced by an oil with change in temperature. It is determined in accordance with the ASTM method described in D2270-79.

5. Pour Point

Any oil intended for low temperature service should be able to flow at the lowest temperature likely to be encountered. The procedure for determining pour point is described in ASTM D-97-66.

The invention will be more clearly understood by referring to the examples which follow.

EXAMPLES 1-6

The following oils were prepared using compounds prepared in accordance with the procedure set forth in U.S. Pat. No. 3,496,217:

A. 75/25% blend of dicyanocyclooctane/dicyanotricyclodecane;

B. 55/45% blend of dicyanocyclooctane/dicyanotricyclodecane;

C. Adiponitrile;

D. 54/46% blend of adiponitrile/dicyanotricyclodecane;

E. 74/26% blend of adiponitrile/dicyanotricyclodecane;

F. 2-methyl glutaronitrile;

G. 15/85% blend of 2-methyl glutaronitrile/dicyanoylcooctane;

H. 75/25% blend of dicyanocyclooctane/dicyanocyclododecatriene.

Lubricants A-F were tested for miscibility with the tetrafluoroethane refrigerant, HFC-134a, over the range of temperatures from −50° C. to 93° C. using 10-70 wt % of the lubricant in mixtures with HFC-134a in accordance with the procedure set forth on Page 10. The results are given in Table I.

TABLE I

Miscibility of HFC-134a with Nitrile Compounds

| Example | Wt % Lubricant | Soluble | Schlirren lines | Hazy |
|---|---|---|---|---|
| 1 | 10A | 93 to −5 |  | −5 to 50 |
|  | 40A | 93 to −5 | −5 to −50 |  |
|  | 70A | 93 to −5 | −5 to −50 |  |
| 2 | 10B | 93 to −5 |  | −5 to −40 |
|  | 40B | 93 to −5 | −5 to −50 |  |
|  | 70B | 93 to −5 | −5 to −50 |  |
| 3 | 10C | 93 to −25 |  | −25 to −50 |
|  | 40C | 93 to −40 |  |  |
|  | 70C | 93 to −25 |  |  |
| 4 | 10D | 93 to −5 |  | −5 to −50 |
|  | 40D | 93 to −5 | −5 to −50 |  |
|  | 70D | 93 to −5 | −5 to −50 |  |
| 5 | 10E | 93 to −10 |  | −10 to −50 |
|  | 40E | 93 to −43 |  | −43 to −50 |
|  | 70E | 93 to −40 |  |  |
| 6 | 10F | 93 to −50 |  |  |
|  | 40F | 93 to −50 |  |  |
|  | 70F | 93 to −50 |  |  |

EXAMPLE 7

The stability of the refrigerant, HFC-134a, with lubricants A, G and H was tested in accordance with the procedure set forth on Pages 10-11. The results are presented in Table II.

TABLE II

Stability of HFC-134a with Lubricants A, G and H in contact with liquid (L), steel-1020 (Fe), copper (Cu) and aluminum 1100 (Al) for 11.8 days.

| Test Temp. °F. | Oil | HFC/oil (cc/cc) | Oil Viscosity @ 100° F. (SUS) | Appearance (0-4) L | Fe | Cu | Al |
|---|---|---|---|---|---|---|---|
| 77 | A | 0.00/3.00 | 462 | 0 | 0 | 0 | 0 |
| 268 | A | 3.00/0.52 | 493 | 0 | 0 | 0 | 0 |
| 268 | H | 3.00/0.52 | 451 | 0 | 0 | 0 | 0 |
| 300 | A | 1.50/1.50 | 353 | 1 (a) | 0 | 0 | 0 |
| 350 | A | 1.50/1.50 | 567 | 2 (b) | 1 (c) | 0 | 0 |
| 300 | G | 1.50/1.50 | ND* | 1 (d) | 0 | 0 | 0 |
| 350 | G | 1.50/1.50 | ND* | 2 (e) | 0 | 0 | 0 |

*Not determined
(a) Hazy, trace white precipitate
(b) Clear, light red
(c) Tarnished-but 100% liquid phase
(d) Clear, pale yellow
(e) Clear, amber

EXAMPLE 8

The viscosity, viscosity index, the pour point, the "four-ball wear" and the "Falex load-to-failure" were determined for lubricants B and H and a commercial one, naphthenic acid, in accordance with the procedures set forth on Pages 11 and 12. The results are presented in Table III.

TABLE III

Properties and lubricity of Lubricants B and H and naphthenic acid

|  | Oil B | Oil G | Oil H | Naphthenic acid |
|---|---|---|---|---|
| Viscosity (SUS) |  |  |  |  |
| at 100° F. | 464 | 176 | 490 | 533 |
| at 210° F. | 56.4 |  | 56.4 | 57.1 |
| Viscosity index | 65 |  | 61 | 52 |
| Pour Point (°C.) | −23 |  | −21 | −23 |
| "Four-ball Wear" (a) |  |  |  |  |
| wear scar | 0.42 ± 0.03 |  | 0.28 | 0.37 |
| coefficient of friction | 0.11 ± 0.003 |  | 0.07 | 0.03 |
| Falex load to failure (b) |  |  |  |  |
| Fail Load (lbs.) | 2300 |  | >4500 | 1250 |
| Torque (in. lbs.) | 60 |  | 87 | 24 |

(a) 52100 steel on 52100 steel, 20 kgf, 225° F., 1200 RPM, 60 min., HFC-134a purge;
(b) steel-on-steel, HFC-134a purge.

EXAMPLES 9-12

A blend of 75/25 wt % dicyanoylcooctane/dicyanocyclododecatriene, lubricant H, was tested for miscibility with a variety of refrigerants:

9. Pentafluoroethane (HFC-125)
10. Tetrafluorochloroethane (HFC-124)
11. Difluorochloromethane (HCFC-22)
12. Difluorodichloromethane (CFC-12)

The results are given in Table IV.

TABLE IV

| Example | Wt. % Lubricant in Comp. with Refrigeration | Temperature range (°C. to °C.) Soluble | Hazy |
|---|---|---|---|
| 9 | 10 | 40 to −50 |  |
|  | 40 | 40 to −50 |  |
|  | 70 | 50 to −50 |  |
| 10 | 10 | 93 to −50 |  |
|  | 40 |  | 93 to −50 |
|  | 70 | 93 to −50 |  |
| 11 | 10 | 70 to −50 |  |
|  | 40 | 70 to −50 |  |
|  | 70 | 70 to −50 |  |
| 12 | Immiscible |  |  |

We claim:

1. In the process of compression refrigeration wherein a blend of refrigerant and lubricant is circulated cyclically through a system of compression and expansion to remove heat from the surroundings, the temperature range for the blend being from 100° C. to −45° C., the improvement which comprises using a blend consisting essentially of (a) as refrigerant, at least one compound selected from the group consisting of 1,1,2,2-tetrafluoroethane, 1,1,1,2-tetrafluoroethane and pentafluoroethane; and (b) as lubricant, at least one compound selected from the group consisting of adiponitrile, 2-methyl glutaronitrile, a blend of adiponitrile and dicyanotricyclododecane, and a blend of dicyanocyclooctane and dicyanotricyclodecane or 2-methyl glutaronitrile.

2. A process as in claim 1 wherein the refrigerant is 1,1,1,2-tetrafluoroethane.

3. A process as in claim 1 wherein the lubricant is adiponitrile.

4. A process as in claim 1 wherein the lubricant is 2-methyl glutaronitrile.

5. A process as in claim 1 wherein the lubricant is a blend of adiponitrile and dicyanotricyclododecane.

6. A process as in claim 1 wherein the lubricant is a blend of dicyanocyclooctane and dicyanotricyclododecane.

7. A process as in claim 1 wherein the lubricant is a blend of cyclooctane and 2-methyl glutaronitrile.

* * * * *